United States Patent [19]
Lorenzana et al.

[11] Patent Number: 6,119,628
[45] Date of Patent: Sep. 19, 2000

[54] ANIMAL WATER DISPENSING APPARATUS

[76] Inventors: Moises B. Lorenzana, 601 Lake Hinsdale Dr., Willowbrook, Ill. 60514; Vance A. Lorenzana, 73 Chippewa Dr., Oswego, Ill. 60543

[21] Appl. No.: 09/422,227

[22] Filed: Oct. 21, 1999

[51] Int. Cl.[7] .................................................. A01K 7/00
[52] U.S. Cl. ............................................................ 119/77
[58] Field of Search ........................ 119/51.5, 77, 52.1, 119/53.5, 54, 61, 78, 79, 80

[56] References Cited

U.S. PATENT DOCUMENTS

| | | | |
|---|---|---|---|
| 3,076,435 | 2/1963 | Seymour | 119/61 |
| 3,306,263 | 2/1967 | Johnson | 119/780 |
| 3,324,834 | 6/1967 | McKinstry | 119/80 |
| 4,573,434 | 3/1986 | Gardner | 119/77 |
| 4,800,845 | 1/1989 | Budd | 119/61 |
| 5,207,182 | 5/1993 | Lorenzana | 119/77 |
| 5,488,927 | 2/1996 | Lorenzana et al. | 119/51.5 |
| 5,758,599 | 6/1998 | Glanville | 119/77 |

*Primary Examiner*—Thomas Price
*Attorney, Agent, or Firm*—Neil M. Rose

[57] ABSTRACT

Animal water dispensing apparatus including a molded plastic base member which has a reservoir support portion and a water receiving recess connected to receive water from a reservoir with a stainless steel liner for the recess being formed with small apertures to allow water to flow into the liner.

10 Claims, 2 Drawing Sheets

ANIMAL WATER DISPENSING APPARATUS

BACKGROUND OF THE INVENTION

1. Field of the Invention

The present invention relates generally to apparatus for supplying water to animals such as domestic pets, and more specifically to an improvement in the type of watering apparatus in which an inverted bottle serves as a reservoir to continuously supply water and maintain a selected water level in a receptacle such as a bowl from which the animal may drink the water.

2. Description of the Prior Art

Pet owners who are forced to leave there pets unattended for substantial periods of time have long been interested in providing their pets with watering apparatus which will have ample capacity to satisfy the pet's water requirements. Further, for hygienic reasons it is undesirable to leave a large amount of water standing in a single open reservoir. One preferred means of providing a continuous supply of water over a period of time involves the use of an inverted bottle arranged to deliver its contents of water slowly or as required into a small receptacle. Since the pet's water requirements may be kept in an appropriately sized inverted reservoir bottle, the pet can consume the water from a receptacle having a size suited for the pet and only so much water as is necessary to fill this receptacle is left out standing at any one time. Thus, the pet is not forced to drink from an oversized receptacle and some of the water remains stored in the inverted bottle.

The bottle for such apparatus will normally take the form of the readily available two-liter soft drink bottle found in most supermarkets. The receptacle from which the pet may drink can be an integrally formed cup shaped bowl portion of the watering apparatus. The bowl portion of a typical watering apparatus is integrally formed with a bottle support portion capable of receiving the mouth and neck of the upended bottle and thereby supports the bottle.

A passageway extends between the bottle support portion and the bowl portion so that the water passing out of the mouth of the bottle may move laterally into the drinking bowl. The level of the water in the bowl is constant, being determined by the height of the mouth of the bottle supplying the water. The bottle support portion is designed to support the mouth of the bottle at a level such that the water level in the bowl is below the top edge of the walls defining the bowl. Thus, additional water will flow from the bottle into the bowl only to reestablish the level as the pet consumes the water.

Examples of this type of pet waterer are disclosed in our previously issued United States patents as follows, U.S. Pat. Nos. Des. 296,371; Des. 316,382; Des. 365,668; and 5,488,927. Other patents of interest with respect to this general type of watering apparatus are the U.S. patents to Gardner U.S. Pat. No. 4,573,434 and Pearce U.S. Pat. No. 3,720,184. These typical devices would be most likely fabricated as an integral molded part made of plastic material since this approach permits the inexpensive fabrication of complex shapes. Although the use of a plastic molding permits the production of an inexpensive product, there are disadvantages in using plastic in a consumer product of this type. For example, particulate matter from the environment, the water or the pets themselves, whether dogs or cats, often can deposit in the bowls which over time may cause or promote the growth of molds on the surface of the dish or bowl. This tendency of unwanted materials to adhere to the surface can be compounded or worsened over time by scrapes and abrasions on the soft plastic. There has also been evidence that some pets have allergic reactions to the plastic material causing them to break out in the area around mouth. As a consequence of the consumers' dissatisfaction with plastic for pet dishes and bowls, a need is recognized for a bowl which is more sanitary and less subject to the problem noted above. Many consumers have rejected plastic water bowls in favor of ceramic bowls, stainless steel bowls or disposable insertable bowls.

A pet feeder including stainless steel bowls is disclosed in the Jones U.S. Pat. No. 4,532,898, and examples of patents directed to disposable food dishes or liners are the U.S. patents to Walker U.S. Pat. No. 5,782,374 and Budd U.S. Pat. No. 4,800,845.

There have been attempts in the past to make spill resistant bowls that have means provided to minimize the spillage or splashing which might occur when a large animal is drinking from the bowl. The patent to Lorenzana U.S. Pat. No. 5,207,182 includes a funnel shaped extension outwardly from the water-containing bowl with one or more water supply bottles mounted within the funnel area. The patent to Pelsor U.S. Pat. No. 5,881,670 provides a bowl of increased capacity through the use of two chambers defined by two nested containers which are in fluid communication but are well spaced from each other to allow the water contained in each chamber to be contained against spilling if the apparatus is tilted.

There are, however, no examples of pet watering apparatus of the type using the inverted water bottle reservoir which are adapted to utilize stainless steel bowls or bowls of other materials less subject to sanitation or allergy problems than plastic.

SUMMARY OF THE INVENTION

The animal water dispensing apparatus of the present invention includes a molded plastic member having a first recess for receiving and supporting a plastic bottle in an upended position to serve as a reservoir supplying water continuously to a second recess in said member with a passageway extending from the first to the second recess so that the water from the reservoir bottle maintains a constant level of water in the second recess. Received in the second recess is a cup or bowl of a corrosion resistant material such as stainless steel. The bowl has a bottom wall, side walls and a peripheral lip or rim extending outwardly from the top edge of the side walls in order to shield the plastic forming the second recess from contact by the pet or animal drinking the water from the apparatus. Positioned in the bottom wall of the bowl is a plurality of small holes to permit the water flowing into the second recess to flow into the bowl itself The holes are sufficiently small that they present no noticeable discontinuity in the bottom wall to an animal drinking from the bowl and minimize the possibility of debris which the animal might deposit in the bowl from passing down into the recess in the plastic member. The bottom wall of the bowl is spaced slightly above the adjacent wall of the plastic member so the plastic wall forms no obstruction to the passage of water into the bowl.

In its preferred configuration, the bottom wall of the bowl has a raised circular flat portion surrounded by a narrow annular portion defining the outer periphery of the bottom wall. The holes in the bottom walls of the bowl are disposed at equally spaced points around this annular portion. With the holes being close to the bowl sidewall and depressed below the flat central position of the bottom, the holes are not likely to be contacted by the tongue of a drinking animal.

It is an object of the present invention to provide an improved animal water dispensing apparatus in which a metallic, corrosion resistant bowl is positioned to receive water continuously from an elevated water reservoir that maintains a constant level of water in the bowl.

It is a further object of the present invention to provide a plastic body member which supports in integrally formed recesses an inverted water bottle reservoir and a corrosion resistant bowl in a horizontally spaced relationship with a passageway provided to conduct water from the reservoir to the bowl maintaining a constant water level in the bowl as water is consumed from the bowl.

It is another object of the invention to provide an improved animal watering apparatus including a cup shaped stainless steel bowl that is supported in a plastic body member in an upwardly facing first recess, the body member also having a second recess for supporting an inverted reservoir bottle positioned to deliver water to the upwardly facing first recess through a conduit in the body member, the bowl having bottom openings for water to pass from the cup shaped first recess into the bowl.

It is still another object of the present invention to provide an improved pet watering apparatus having a plastic body member with means for supporting an inverted reservoir bottle which maintains a constant water level in an adjacent upwardly facing recess in the body member and a stainless steel liner for the recess having a plurality of small bottom openings to maintain said constant water level in the liner.

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENT

Figure 1:
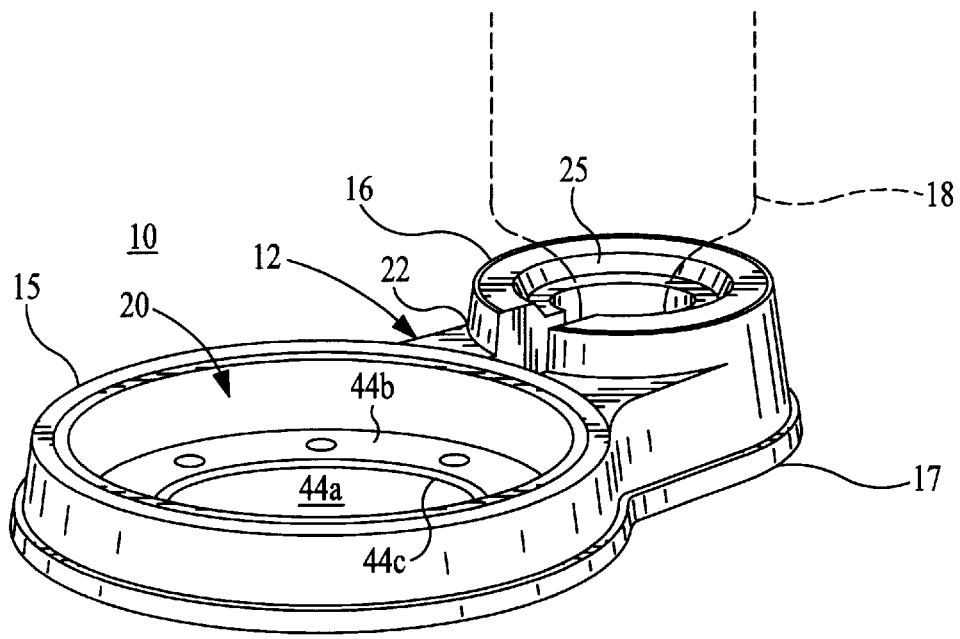
FIG. 1 is a perspective view of an animal water dispensing apparatus of the present invention with a water bottle reservoir shown in broken lines for illustrative purposes.

Reference will now be made in detail to the present preferred embodiment of our invention, an example of which is illustrated in the accompanying drawings. In FIG. 1 there is illustrated an animal watering device 10 comprising a body or base member 12 having a bowl portion 15, and a bottle support portion 16. Preferably, the body member 12 is formed of a single unitary piece by means of molding plastic material. The use of plastic materials that may be injection molded provide an economical means of constructing body member 12. Thus, the bottle support portion 16 and bowl portion 15 are integral portions of a single molded piece. The body or base member 12 is formed with a base portion 17 that serves to support device 10 on a horizontal surface.

The use of a plastic soda bottle to act as a reservoir for supplying water to a pet watering device is known in the art. The type of bottle commonly used is a two-liter plastic soft drink bottle, which is readily available and need not be supplied with the watering apparatus. As illustrated in phantom in FIG. 1, such a reservoir bottle 18 is mounted on the body member 12 with the bottle in an upended position with the neck and mouth of the bottle 18 being disposed in the bottle support portion 16. This bottle 18 is preferably provided by the consumer and serves as the water reservoir of the animal watering device 10. In the preferred embodiment the bottle support portion 16 is adapted to hold such readily available plastic bottles as typically come in the form of one or two liter sizes containing a variety of beverages.

In order to retain the bottle 18 in position on the body member 12 to supply water thereto, bottle support portion 16 is provided with a recess 25 which receives the threaded neck of the upended bottle 18. The recess 25 is located at one end of base member 12 and projects down into the base member 12 to a planar bottom wall 32. For the purpose of engaging the bottle 18 away from the neck portion to hold it in a stable position, the recess 25 is formed with an annular shoulder or depression 26 which is located on the upper surface of base member 12. The portion of recess 25 extending below the depression 26 is of reduced diameter comprising an internally threaded portion 28. The annular shoulder or depression 26 serves not only to support bottle 18 but also serves to catch any water spilled when bottle 18 is put in position within threaded recess 25. The threaded portion 28 includes integrally formed threads 30 located on the interior surface of the threaded portion 28. Threads 30 are formed so that they engage the corresponding threads located around the mouth of bottle 18. Thus bottle 18 can be screwed into the threaded portion 28 so that bottle 18 is held in place with its body engaged against the annular shoulder 26 for stability.

In order to deliver the water from the recess 25 in the bottle support portion 16, the body member 12 is formed with a passageway or channel 22 which extends horizontally between the two portions 15 and 16. The channel 22 is open at the top and defined by a bottom wall 24 and upwardly diverging sidewalls 23.

In accordance with the invention, the bowl portion 15 of base member 12 is formed with a bowl recess 34 into which the passageway 22 connects to permit water flow from the bottle 18. Bowl recess 34 is a rounded, generally cylindrical recess with a continuous sidewall 38 and a flat or planar bottom 36. The planar bottom 36 of recess 34 meets bottom 24 of passageway 22 where passageway 22 enters the bowl portion 15. Sidewall 38 extends upwardly around the circumference of planar bottom 36 up to the top side of base member 12. The top edge of sidewall 38 defines a support rim 40 which runs continuously along the top of sidewall 38 being interrupted only in the area wherein passageway 22 extends into bowl recess 34.

When the bottle 18 is mounted in the animal watering device 10, the mouth of the bottle 18 is positioned within the recess 25 at a level spaced above the bottom 32 so that water may discharge from the bottle into the recess 25 where it then flows through the passageway 22 into the bowl recess 34. Water will continue to flow from the bottle 18 until a level is obtained in the bowl recess 34 and the passageway 22 that corresponds to the level of the mouth of the bottle 18. At that point, flow will cease until an animal drinking from the bowl recess 32 reduces the water level below the level of the bottle mouth at which time flow will resume until equilibrium is again obtained. In this way the bottle 18 may serve as a reservoir to supply water to the bowl recess 34 over a substantial period of usage by the animal drinking there from.

If a pet is consuming water out of the same receptacle for a possibly extended period of time, sanitary concerns can become of increasing importance. Therefor, it is a desire of the present invention to minimize the drawbacks created by the use injection molded plastic material that may be susceptible to scratching and harboring of bacteria or other unsanitary deposits.

Base member 12 is formed preferable of a plastic material which may be molded economically to provide a durable part of a complex shape. Known durable plastic materials used in manufacture of such parts have a surface with a relatively high porosity or are easily scratched creating sanitary problems involving bacterial growth and the like. While there are alternative materials that might be used in fabricating base member 12, these materials would raise the cost of the product to an unacceptable level. Examples of more sanitary materials include ceramic, stainless steel or coated steel surfaces. Coated steel surfaces can include porcelain or epoxy resin based coatings. Because of the complex shape of the base member 12 with its bottle support structure, it would be prohibitively expensive to make the base member 12 of any of these materials.

According to a present preferred embodiment of the invention, a corrosion resistant metallic bowl 20 is provided which is adapted to fit into bowl recess 34. Metallic bowl 20 is a round bowl with a generally cylindrical sidewall 42 and bottom 44. Sidewall 42 extends up from bottom portion 44 to a protruding rim 46. When metallic bowl 20 is placed within bowl recess 34, protruding rim 46 rests on sidewall rim 40 so that space left between bottom 44 of bowl 20 and bottom 36 of recess 34 allows water to flow freely from passageway 22 up under bowl 20. To permit the water in recess 34 to flow into the interior of the bowl 20 where an animal may drink there from, the bowl 20 is formed with a plurality of holes 48 in the bottom 44. The shape of the bowl 20 with its generally cylindrical side wall 42, circular bottom 44 and annular rim 46 is such that it may be manufactured in a corrosion resistant material such as stainless steel very economically by spinning or stamping.

The bottom 44 of the bowl 20 is made up of a flat, circular central portion 44a which is surrounded by an annular peripheral portion 44b from which the sidewall 42 extends upwardly. An angled or beveled wall 44c connects the central portion 44a with the annular portion 44b so that the annular portion is slightly depressed below the plane of the central portion 44a.

Figure 2:
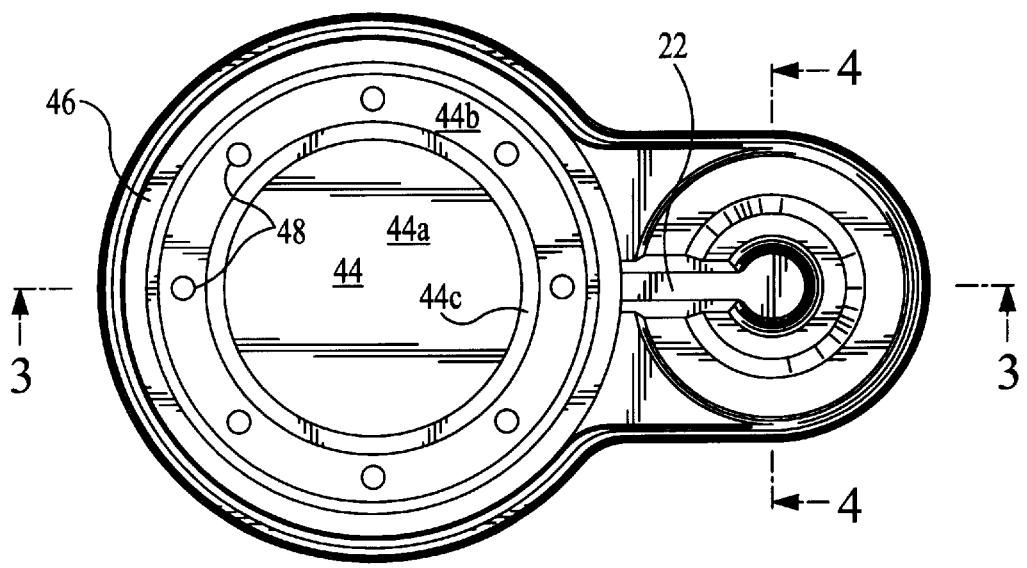
FIG. 2 is a top plan view of the apparatus of FIG. 1.
Figure 3:
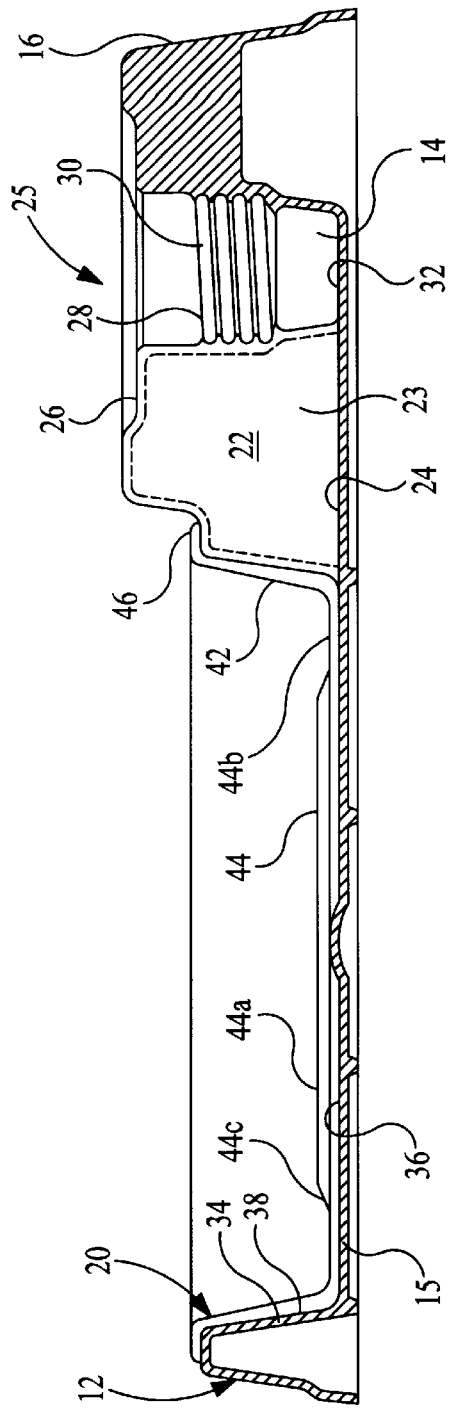
FIG. 3 is a vertical sectional view taken substantially on line 3—3 of the water dispensing apparatus of FIG. 2.
Figure 4:
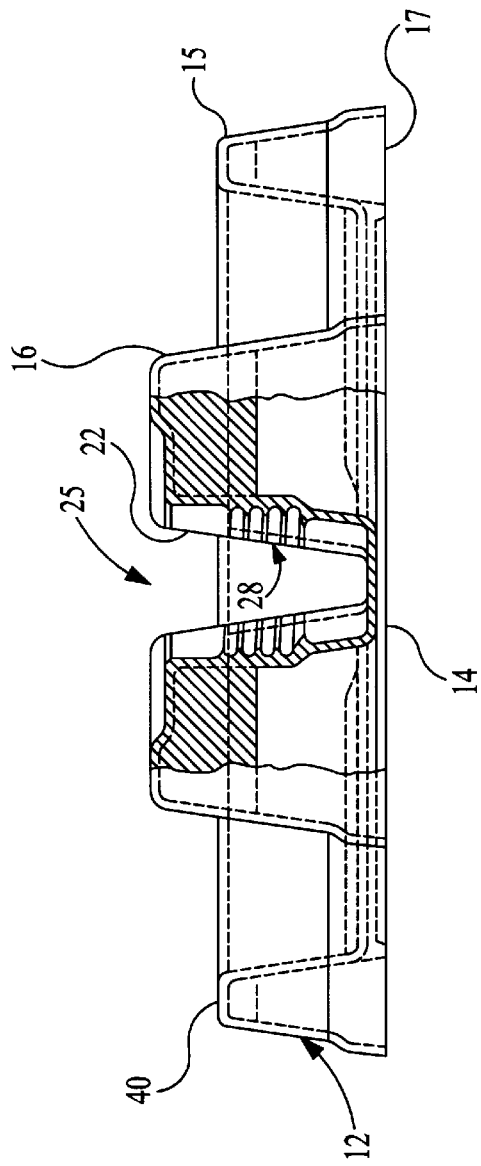
FIG. 4 is a vertical sectional view taken substantially on line 4—4 of the water dispensing apparatus of FIG. 2 with the stainless steel bowl insert removed.

While it is important to have sufficient opening into the bowl 20, it is desirable to minimize the size and number of the holes 48 since the holes may permit contamination introduced by the user of the bowl 20 to migrate into the area of the bowl recess 34 exterior of the bowl 20 where it might, for instance, start bacterial growth in the adjacent parts of the base member 12. To achieve the amount of flow desired and to keep the hole size small, the holes in the preferred embodiment are dispersed in an annular pattern as shown in FIG. 2 with a total of 8 holes of approximately 5/16 of an inch in diameter. The holes 48 are located in the annular portion 44b of the bottom 44 and are equally spaced around the central portion 44a. Because of the fact that the holes are in a portion of the bottom adjacent to the sidewall 42 and depressed below the level of the central portion 44a of the bowl bottom, they are not likely to be contacted by a drinking animal. It should be understood that the holes 48 may take various alternative forms such as slots, rectangular openings or other configurations. In addition, the holes may be disposed in the portions of the sidewall 42 below the level of the water in the recess 34 rather than in the bottom of the bowl 20.

In a constructed embodiment of the invention suitable for use by small dogs and cats, the bowl 20 was on the order of 6 inches in diameter and the bottle 18 was mounted with its mouth at a height above the bottom 32 of recess 25 so that the water level in the bowl 20 was on the order of ¾ of an inch. Animals using the apparatus tend to drink from the central portion of the bowl 20 reducing the possibility of the animal's tongue engaging the holes 48 and possibly causing injury or irritation to the animal. It is contemplated that the invention is applicable to watering apparatus suitable for larger animals as, for example large dogs, in which case the base member 12 and the bowl 20 would be scaled up to provide a suitable receptacle from which such an animal could drink.

One of the major advantages of having the metallic bowl 20 separable from the base member 12 relates to the convenience provided during the periodic cleaning of the bowl 20. The bowl 20 may be removed from the base member 12 while the bottle 18 is still entirely or partially filled with water. As the bowl 20 is removed from the recess 34, the water in the bowl 20 drains out of the bowl into the recess 34 allowing one to then wash out the bowl to remove debris deposited by the animal or water stains on the surface of the bowl 20. The cleaned bowl may then be replaced in the water filled recess 34 with the bowl 20 filling with water as it settles into its normal position in the recess 34. This arrangement thus allows the base member 12 and the reservoir bottle 18 to remain in assembled position on the floor while the bowl 20 is removed, cleaned and then replaced in the bowl recess 34.

It will be apparent to those skilled in the art that various modifications and variations may be made in the disclosed preferred embodiments without departing from the scope or spirit of the invention. As an example, detents may be provided in moldable body member 12 in order to keep corrosion resistant metal bowl 18 held in place during filling or during use by animals. Thus it is intended that the present invention cover the modifications and variations of this invention, provided they come within the scope of the appended claims and their legally permissible equivalents.

What is claimed is:

1. An animal watering device having a base member formed with a bowl portion, a bottle support portion, and a passageway connecting the bowl portion and the bottle support portion in flow communication, the passageway being adapted to conduct water between the two portions, the bottle support portion of said body member forming an upwardly facing recess shaped to receive and support the mouth and neck portion of an upended bottle to supply water continuously to the bowl portion through the bottle support portion and the passageway, further comprising:

a first recess in said bowl portion having a planar bottom portion and a sidewall extending upwardly from the periphery of said planar bottom portion, said side wall having a rim along its upper edge, said bottle support portion mounting the mouth of said bottle at a level so that water from said bottle flows through said passageway into said bowl portion to fill said bowl portion to a level below said rim of said side wall, a corrosion resistant metallic bowl having a bottom wall and side walls shaped to be received in said first recess, said bowl being formed with a plurality of openings in said bottom wall to accommodate water flow from said bottle and said bottle support portion into said bowl to maintain water at said water level in said bowl.

2. The combination of claim 1, wherein said bowl includes a peripheral rim extending outwardly from the upper most edge of said bowl side walls to overlie the walls of said body member.

3. The combination of claim 1, wherein said bowl bottom wall is spaced from said body member defining said first recess to permit water flow through said opening in said bottom wall.

4. An animal watering apparatus comprising, a molded plastic water receptacle formed with a first upwardly facing recess accessible for an animal to drink therefrom, a reservoir in fluid communication with said first recess to supply water continuously to said first recess and to maintain a preselected water level in said first recess, said reservoir including a second recess in said water receptacle, said second recess being formed with means to support an upended water bottle with a discharge opening at said preselected water level, a corrosion resistant metallic liner shaped to fit within said first recess and having a bottom surrounded by upstanding peripheral side walls terminating in an outwardly directed rim, said liner being formed with a plurality of openings positioned below said preselected water level when said liner is received in said recess, said liner being supported on said water receptacle by said rim and being spaced from said water receptacle to permit water to flow from said reservoir through said openings into said metallic liner, said liner being readily separable from first recess and said receptacle for cleaning purposes.

5. Animal watering apparatus comprising:

a body member of molded plastic material having a base for supporting said body member on a horizontal surface and being formed with first and second horizontally spaced upwardly facing recesses, a channel formed in said body member extending between said first and second recesses for water to pass from said second to said first recess, said first recess having a generally horizontal bottom wall from which a cylindrical side wall extends upwardly terminating in a generally horizontal rim to define a cup shaped recess from which an animal may drink, said second recess being formed to receive and support an upended reservoir bottle with the bottle having a mouth opening positioned within said second recess horizontally spaced from said first recess and positioned vertically between said first recess bottom and rim so water from said bottle maintains a constant water level in said first recess, a receptacle of corrosion resistant material received within said first recess and having side walls and a bottom wall conforming to the shape of said first recess, said receptacle being formed with a plurality of holes through which water flows from said first recess into said receptacle.

6. The apparatus of claim 5 wherein said receptacle is supported by said body member with said receptacle bottom wall being spaced from said first recess bottom wall to provide water flow from said first recess through said holes into said receptacle.

7. The apparatus of claim 6 wherein said receptacle bottom wall is formed with a flat circular central portion surrounded by a depressed annular portion, said holes being disposed in said depressed annular portion adjacent to said receptacle walls.

8. The apparatus of claim 7 wherein said receptacle is formed of stainless steel and includes at the upper extent of its side walls an outwardly extending annular flange which overlies and engages said rim of said first recess to support said receptacle thereon.

9. The apparatus of claim 6 wherein said holes in said receptacle are disposed in an annular pattern around the periphery of the bottom of said receptacle.

10. The apparatus of claim 6 wherein said plurality of holes comprises holes on the order of one quarter of an inch in diameter and are disposed adjacent to said receptacle sidewalls.

* * * * *